UNITED STATES PATENT OFFICE.

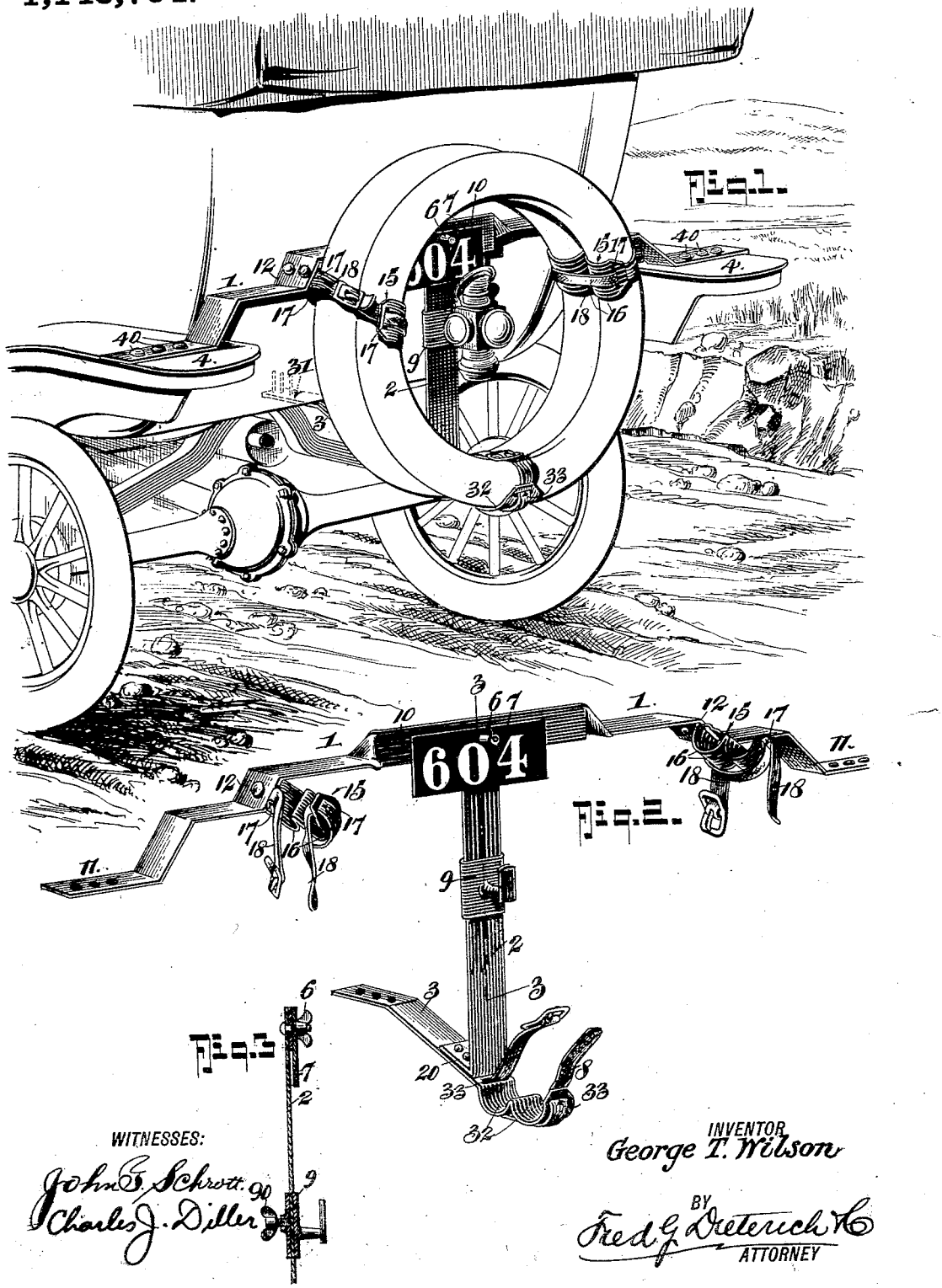

GEORGE TORRENCE WILSON, OF HARLEM, GEORGIA.

TIRE RACK OR SUPPORT.

1,148,734. Specification of Letters Patent. Patented Aug. 3, 1915.

Application filed December 10, 1914. Serial No. 876,488.

*To all whom it may concern:*

Be it known that I, GEORGE T. WILSON, residing at Harlem, in the county of Columbia and State of Georgia, have invented certain new and useful Improvements in Tire Racks or Supports, of which the following is a specification.

This invention has reference to that class of attachments for automobiles adapted for supporting extra tires and it primarily has for its object to provide an improved attachment of the general character stated, of a simple and economical construction and which in addition to its use as a tire support also serves as a bracing means for the rear fenders, and a convenient support for the lamp and license tag.

With other objects in view that will hereinafter appear, my invention consists in the peculiar combination and novel arrangement of the parts hereinafter fully explained, specifically pointed out in the appended claims, and illustrated in the accompanying drawings, in which:

Figure 1 is a perspective view of my invention, the same being shown as operatively applied for use. Fig. 2 is a similar view of the attachment. Fig. 3 is a vertical section on the line 3—3 of Fig. 2.

The practical embodiment of my invention is clearly disclosed in Fig. 1 of the drawings, by reference to which it will be seen my said invention consists essentially of a main or body portion 1, a pendent hanger 2, and a combined bottom support and brace member 3, each of which, in practice, is in the nature of a sheet metal strap and bent up the desired shape in the manner presently explained.

The main or body portion, midway its ends, is twisted to form a vertical or flat bearing portion 10 and between the said portion 10 and its ends 11, it is bent to form downwardly inclined or angle members 12, the reason for which will presently appear.

The member 1 is of sufficient length to extend across the back of the machine so its ends rest upon the rear ends of the fenders 4—4, to which they are fixedly secured by the rivets 40, as shown. Member 1, which serves as the main support for the tires also acts as a brace for holding the fenders rigid and against rattling.

The pendent or hanger member 2 is detachably suspended from the flat bearing portion 10 of the member 1 by a set screw 6 which also secures the tag or number plate 7 in proper position.

The bottom support and brace member 3 is riveted to the foot portion 20 of the hanger 2, and it extends transversely of the member 1, its inner end being bent up and of such length that it can be conveniently bolted or otherwise made fast to the bottom of the car body, as shown at 31, on Fig. 1.

The forward end of the member 3 extends beyond the member 2, and it is bent forward to form one or more concaved tire holding seats 32, and the said extended portion has slots 33—33 through which passes a strap 8 for securely holding the tire or tires on the seats 32.

9 designates a lamp holder that is slidably and removably mounted in the hanger 2 and is held in the desired adjustment by the clamp screw 90, see Fig. 3.

15—15 designate sheet metal strap plates, one of which is riveted onto the under side of each of the angled members 12—12 and projected outwardly therefrom, as is best shown in Fig. 2, and the said projected portions are curved to form one or more seats 16—16 for receiving the upper end of the tire and the said projected portions have slots 17—17 that receive the straps 18 for securely holding the upper ends of the tires in place.

By reason of projecting the seat members 16 at an angle, as shown and described, a more perfect and convenient securing of the upper ends of the tires is provided for than would be the case if the said members 16 were projected in the horizontal plane from the main member 1.

By reason of attaching the securing straps to the members 3, 9 and 15 in the manner stated, the use of rivets or other like means for holding the straps from becoming disconnected from the tire supports, is overcome, and furthermore in case the straps become worn out they can be readily detached from the several members 3 and 15 and new ones substituted therefor.

From the foregoing description taken in connection with the drawings, the complete construction, the manner of use and the advantages of my invention will be readily understood.

The attachment is of a very economical nature, of durable construction and can be readily attached to any of the standard types of motor vehicles and by reason of supporting the tires and the lamp and the tag or number plate in the manner shown and described, the lamp and the tag plate are visible within the tires, the latter also acting as a guard against the accidental displacement of the lamp or tag plate.

What I claim is:

1. In a tire holder, the combination with the fenders and the body of the vehicle; of a bar secured to the fenders and bridging the space between the said fenders at the rear of the vehicle body, a hanger pendent from the said bar, means securable to the vehicle body and to the said hanger for supporting the same, and tire securing socket elements carried by the aforesaid structure.

2. In a tire holder, the combination with the fenders and the body of the vehicle; of a bar secured to the fenders and bridging the space between the said fenders at the rear of the vehicle body, a hanger pendent from the said bar, means securable to the vehicle body and to the said hanger for supporting the same, tire securing socket elements carried by the aforesaid structure, and a lamp holder secured to the said hanger and adapted to receive a signal lamp and sustain it within the circumference of the tire.

3. In a tire holder, the combination with the fenders and the body of the vehicle; of a bar secured to the fenders and bridging the space between the said fenders at the rear of the vehicle body, a hanger pendent from the said bar, means securable to the vehicle body and to the said hanger for supporting the same, tire securing socket elements carried by the aforesaid structure, a lamp holder secured to the said hanger and adapted to receive a signal lamp and sustain it within the circumference of the tire, and a further means on the hanger for holding the tag or number plate above the lamp and within the circumference of the tire.

4. An attachment for motor vehicles, comprising a main member or bar of a length sufficient to bridge the space between the rear fenders and whose ends are adapted for being attached to the said fenders, a hanger pendent from the said bar, a supporting member fixedly attached to the lower end of the hanger, said member including a rear extension adapted to be secured to the body of the vehicle and a front extension having a tire holding socket and flexible tire securing elements connected to the said front extension and to the main bar for securing the tire.

5. In a tire holder, the combination with the vehicle body and the fenders; of a main member or bar that bridges the space between the fenders and whose ends are secured upon the rear ends of the said fenders, the said bar including angled portions, tire supports secured to the said angled portions and having tire receiving seats, a hanger pendent from the main bar, a supporting member secured to the lower end of the hanger and to the bottom of the vehicle body, said member including an extension having tire receiving seats and flexible devices on each of the members having the tire seats for securing the tires on the said seats.

6. In a tire holder, the combination with the vehicle body and the fenders, of a cross bar secured at its ends on the said fenders and which bridges the space between the fenders at the rear of the vehicle body, a hanger pendently secured to the said cross bar, a supporting member secured on the lower end of the hanger, said member including a forward extension having a seat to receive the lower end of the tire, and having a slot at each side of the said seat, extensions projected from the cross bar one at each side, said extensions each having a seat to receive the upper end of the tire, each of said last named extensions having a slot at each side of the tire receiving seat and strap members that engage with the slots in the several extensions having the tire seats for clamping the tire onto the said seats.

GEORGE TORRENCE WILSON.

Witnesses:
W. A. WILSON,
H. HATCHET.